US012680514B1

(12) United States Patent
Chere et al.

(10) Patent No.: US 12,680,514 B1
(45) Date of Patent: Jul. 14, 2026

(54) ACTUATED FRAME AND TAIL CONE FOR EXHAUST CHANNEL TRACK SELECTION

(71) Applicant: RTX CORPORATION, Farmington, CT (US)

(72) Inventors: Gregory M. Chere, Glastonbury, CT (US); Simon W. Evans, Farmington, CT (US); Jesse M. Chandler, S Windsor, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 19/276,270

(22) Filed: Jul. 22, 2025

(51) Int. Cl.
*F02C 9/52* (2006.01)
*F02C 7/08* (2006.01)
*F02C 7/22* (2006.01)
*F23R 3/36* (2006.01)

(52) U.S. Cl.
CPC .................. *F02C 9/52* (2013.01); *F02C 7/08* (2013.01); *F02C 7/22* (2013.01); *F23R 3/36* (2013.01); *F05D 2220/323* (2013.01); *F05D 2260/20* (2013.01)

(58) Field of Classification Search
CPC ...... F02C 9/52; F02C 7/08; F02C 7/22; F23R 3/36; F05D 2220/323; F05D 2260/20; F02K 1/06; F02K 1/08; F02K 1/09; F02K 1/28; F02K 1/30
See application file for complete search history.

(56) References Cited

U.S. PATENT DOCUMENTS

| | | | | |
|---|---|---|---|---|
| 3,116,604 | A * | 1/1964 | Matthew ................... | F02C 7/08 |
| | | | | 165/125 |
| 5,119,624 | A * | 6/1992 | McKenna ................. | F02C 9/16 |
| | | | | 60/39.15 |
| 5,392,595 | A * | 2/1995 | Glickstein ................ | F02C 6/18 |
| | | | | 60/39.12 |
| 5,615,497 | A * | 4/1997 | Meschan .............. | A43B 21/433 |
| | | | | 36/31 |
| 7,246,484 | B2 * | 7/2007 | Giffin, III .............. | F02K 3/077 |
| | | | | 60/226.3 |
| 7,254,937 | B2 * | 8/2007 | Hull ......................... | F02C 7/10 |
| | | | | 60/39.511 |
| 8,961,114 | B2 | 2/2015 | Ruthemeyer | |
| 10,738,703 | B2 * | 8/2020 | Schwarz ................. | F02C 7/185 |
| 10,801,410 | B2 * | 10/2020 | Roberge ................. | F01D 9/065 |
| 11,105,340 | B2 * | 8/2021 | Cheung ................. | B64D 27/20 |
| 11,187,156 | B2 * | 11/2021 | Niergarth ........... | B01D 19/0005 |
| 11,492,971 | B2 * | 11/2022 | Sodaro ................... | F02K 3/105 |
| 11,684,974 | B2 * | 6/2023 | Schmitz ................... | F02C 7/18 |
| | | | | 60/39.511 |
| 11,905,884 | B1 * | 2/2024 | Dindar ..................... | F02C 3/22 |
| 11,946,415 | B2 * | 4/2024 | Rambo ..................... | F02K 1/40 |
| 12,110,839 | B1 * | 10/2024 | McCaffrey ............... | F02K 1/40 |

(Continued)

FOREIGN PATENT DOCUMENTS

EP 3483411 B1 * 9/2025 ............... F02C 6/08

*Primary Examiner* — Craig Kim
(74) *Attorney, Agent, or Firm* — Carlson, Gaskey & Olds, P.C.

(57) ABSTRACT
An aircraft propulsion system includes a dual exhaust path assembly that includes actuatable blocker doors moveable between a bypass configuration for directing the exhaust gas flow through an outer passage and a heat exchange configuration for directing the exhaust gas flow through a heat exchanger assembly.

14 Claims, 8 Drawing Sheets

(56) References Cited

U.S. PATENT DOCUMENTS

| 12,116,930 B2 * | 10/2024 | Maurer | F02C 7/042 |
| 2007/0245739 A1 * | 10/2007 | Stretton | F02C 7/185 |
| | | | 60/728 |
| 2015/0337730 A1 * | 11/2015 | Kupiszewski | F02C 7/16 |
| | | | 60/39.465 |
| 2017/0335715 A1 * | 11/2017 | Youssef | F02C 3/04 |
| 2019/0072035 A1 * | 3/2019 | Peace | F02C 7/18 |
| 2019/0153953 A1 * | 5/2019 | Niergarth | F02C 7/141 |
| 2020/0088099 A1 * | 3/2020 | Roberge | F02C 7/224 |
| 2020/0088102 A1 * | 3/2020 | Roberge | F02C 7/224 |
| 2020/0165974 A1 * | 5/2020 | Smith | F02C 7/18 |
| 2023/0076757 A1 * | 3/2023 | Rambo | F02C 7/10 |
| 2023/0323814 A1 * | 10/2023 | Terwilliger | F02C 3/22 |
| | | | 60/806 |
| 2024/0199230 A1 * | 6/2024 | Ribeiro | B64F 5/00 |

* cited by examiner

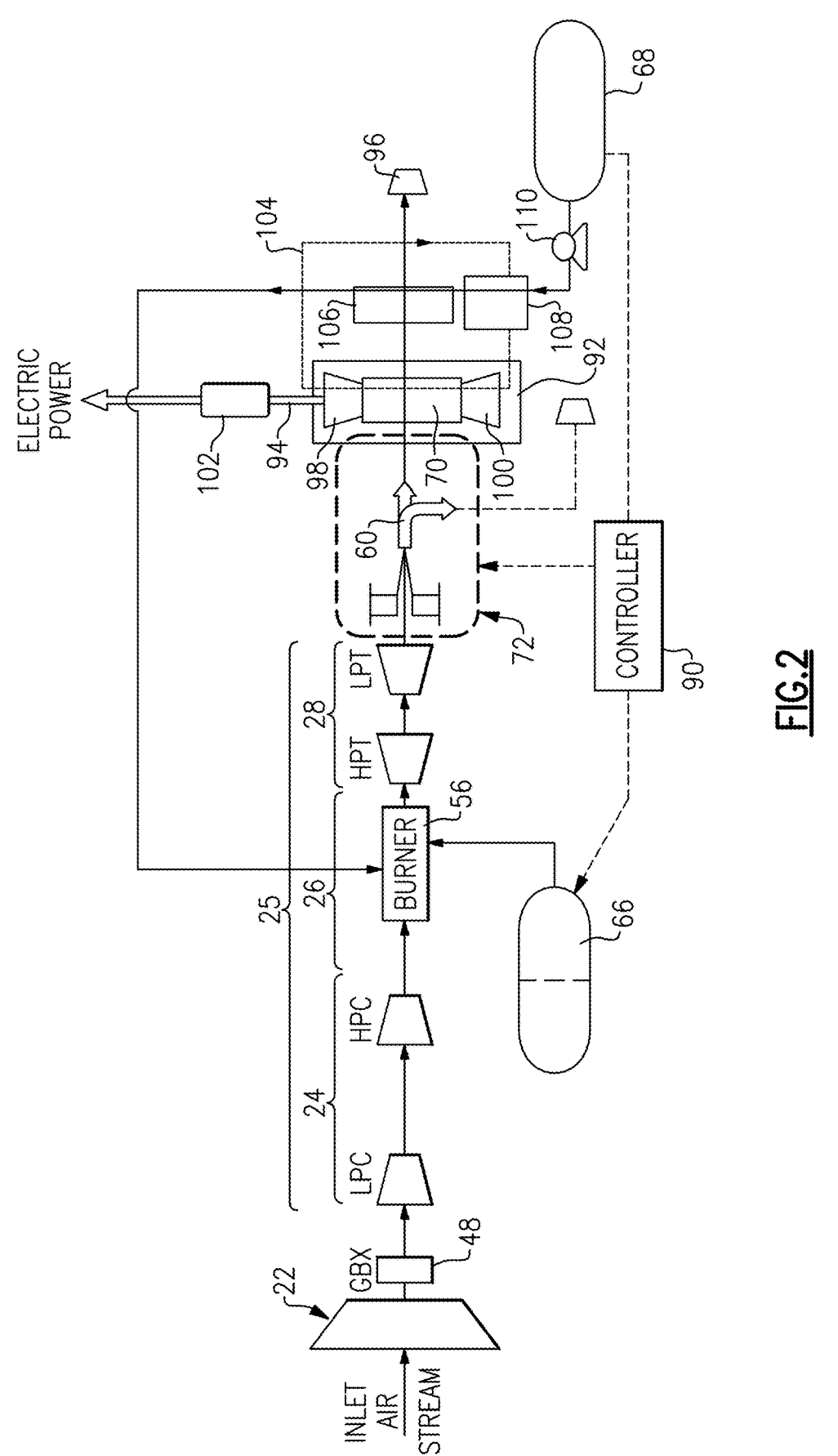
_FIG.2_

ACTUATED FRAME AND TAIL CONE FOR EXHAUST CHANNEL TRACK SELECTION

TECHNICAL FIELD

The present disclosure relates to a multi-fuel gas turbine engine and more specifically to features for varying a gas flow path dependent on fuel type utilized by the gas turbine engine.

BACKGROUND

Reduction and/or elimination of carbon emissions generated by aircraft operation is a desire of aircraft manufacturers and airline operators. Turbine engines compress incoming core airflow, mix the compressed airflow with fuel that is ignited in a combustor to generate a high energy exhaust gas flow. Alternate fuels can provide reductions in carbon emissions and may be used in combination with other fuel types. Each fuel type may provide unique performance advantages that may be captured utilizing different engine flow path configurations.

SUMMARY

An aircraft propulsion system according to an exemplary embodiment of this disclosure, among other possible things includes a core engine that includes a main compressor where an inlet airflow is compressed and communicated to a combustor to generate an exhaust gas flow that is expanded through a main turbine section to generate power used to drive the main compressor and a propulsive fan, a fuel system that is configured to provide at least two fuel types to the combustor for generating the exhaust gas flow, a heat exchanger assembly that is operable for placing the exhaust gas flow in thermal communication with a working fluid flow, a dual exhaust path assembly that includes actuatable blocker doors moveable between a bypass configuration for directing the exhaust gas flow through an outer passage and a heat exchange configuration for directing the exhaust gas flow through the heat exchanger assembly, and a controller programmed to operate the dual exhaust path assembly to switch between the bypass configuration and the heat exchange configuration based at least in part on a concentration of fuel of the at least two fuel types that the fuel system is providing to the combustor.

In a further embodiment of the foregoing aircraft propulsion systems, the heat exchanger assembly is disposed about an engine longitudinal axis.

In a further embodiment of any of the foregoing aircraft propulsion systems, the heat exchanger assembly includes a disk shape that is disposed about the engine longitudinal axis.

In a further embodiment of any of the foregoing aircraft propulsion systems, the heat exchanger assembly is disposed within an inner passage and the outer passage includes an annular passage that is disposed concentrically around the inner passage.

In a further embodiment of any of the foregoing aircraft propulsion systems, the dual exhaust path assembly includes a single inlet that is configured to receive an exhaust gas flow from the main turbine section and an outlet for the exhaust gas flow from one of the outer passage and an inner passage housing the heat exchanger assembly.

In a further embodiment of any of the foregoing aircraft propulsion systems, the blocker doors include forward blocker doors and aft blocker doors. The forward blocker doors are configured to direct the exhaust gas flow from the inlet to one of the outer passage and the inner passage.

In a further embodiment of any of the foregoing aircraft propulsion systems, the outlet is disposed radially outward of the heat exchanger and the aft blocker doors are configured to direct exhaust gas flow from either the outer passage or the inner passage through the outlet.

In a further embodiment of any of the foregoing aircraft propulsion systems, the outlet includes an outer outlet for the exhaust gas flow from the outer passage and an inner outlet for exhaust gas flow from the heat exchanger assembly, and the aft blocker doors are configured to block the outer outlet when exhaust gas flow is routed through the heat exchanger assembly.

In a further embodiment of any of the foregoing aircraft propulsion systems, the inner outlet includes a tail cone that is disposed about the engine longitudinal axis with a plurality of openings for the exhaust gas flow.

In a further embodiment of any of the foregoing aircraft propulsion systems, the dual exhaust path assembly is attached aft of a turbine exhaust case.

In a further embodiment of any of the foregoing, the aircraft propulsion system further includes a bottoming cycle system where thermal energy communicated into the working fluid flow within the heat exchanger assembly is utilized to generate shaft power.

A bottoming cycle system for an aircraft propulsion system according to another exemplary embodiment of this disclosure, among other possible things includes a heat exchanger assembly operable for placing an exhaust gas flow in thermal communication with a working fluid flow, a dual exhaust path assembly that includes actuatable blocker doors moveable between a bypass configuration for directing the exhaust gas flow through an outer passage and a heat exchange configuration for directing the exhaust gas flow through the heat exchanger assembly, a bottoming turbine where the heated working fluid flow from the heat exchanger assembly expands to generate shaft power, and a controller that is programmed to operate the dual exhaust path assembly to switch between the bypass configuration and the heat exchange configuration in response to a concentration of fuel of at least two fuel types of the fuel system is providing to a combustor.

In a further embodiment of the foregoing bottoming cycle system, the heat exchanger assembly is disposed within an inner passage and the outer passage includes an annular passage that is disposed concentrically around the inner passage.

In a further embodiment of any of the foregoing bottoming cycle systems, the dual exhaust path assembly includes a single inlet that is configured to receive an exhaust gas flow from the main turbine section and an outlet for the exhaust gas flow from one of the outer passage and an inner passage housing the heat exchanger assembly.

In a further embodiment of any of the foregoing bottoming cycle systems, the outlet includes an outer outlet for the exhaust gas flow from the outer passage and an inner outlet for exhaust gas flow from the inner passage, and the aft blocker doors are configured to block the outer outlet when exhaust gas flow is routed through the heat exchanger assembly.

In a further embodiment of any of the foregoing bottoming cycle systems, the controller is programmed to operate the dual exhaust path assembly in the bypass configuration in response to more of the first fuel than the second fuel being provided to the combustor and in the heat exchange configuration in response to more of the second fuel than the first fuel being provided to the combustor.

A method of operating an aircraft propulsion system according to another exemplary embodiment of this disclosure, among other possible things includes communicating a fuel flow that includes a selected one of a first fuel flow comprising a hydrocarbon based fuel and a second fuel flow comprising a cryogenic fuel to a combustor, generating an exhaust gas flow within the combustor of a core engine by igniting a mixture of at least one of the first fuel flow and the second fuel flow and an inlet airflow within a combustor, generating power by expanding the exhaust gas flow through a main turbine section to drive a compressor section and a propulsive fan, and operating a dual exhaust path assembly in a bypass configuration to direct the exhaust gas flow from the main turbine section through an outer passage in response to generating the exhaust gas flow utilizing the first fuel flow and in a heat exchange configuration to direct the exhaust gas flow from the main turbine section through a heat exchanger assembly for communicating thermal energy from the exhaust gas flow into a working fluid flow in response to generating the exhaust gas flow utilizing the second fuel flow.

In a further embodiment of the foregoing, the method further includes generating shaft power by expanding the heated working flow through a bottoming cycle turbine.

In a further embodiment of any of the foregoing methods, the first configuration includes at least one blocker door that directs the exhaust gas flow through a radially outer passage concentric with the heat exchanger assembly.

In a further embodiment of any of the foregoing methods, the heat exchange configuration includes the at least one blocker door directing the exhaust gas flow radially inward through the heat exchanger assembly.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 2 is a simplified schematic view of the example aircraft propulsion system.

DETAILED DESCRIPTION

Figure 1:
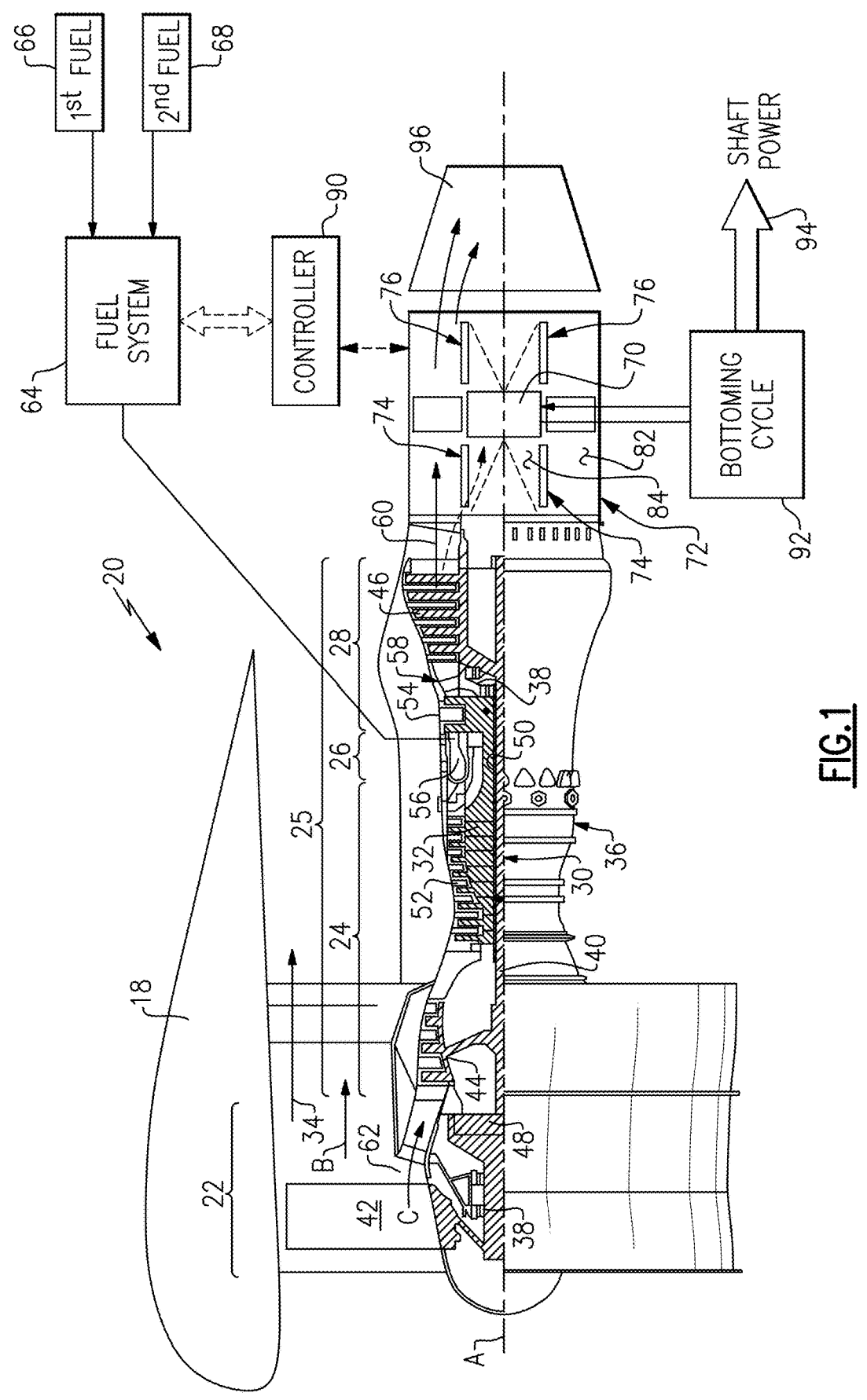
FIG. 1 is a schematic view of an example aircraft propulsion system.

FIG. 1 schematically illustrates a multi-fuel aircraft propulsion system 20 that includes a multi-fuel system 64, a bottoming cycle system 92, a heat exchanger assembly 70, and a dual exhaust path assembly 72. The dual exhaust path assembly 72 provides different concentric flow paths for an exhaust gas flow 60 based on the type of fuel utilized during engine operation.

The dual exhaust path assembly 72 is operable between a bypass configuration where the exhaust gas flow 60 is communicated through an outer passage 82 to bypass the heat exchanger assembly 70 and a heat exchange configuration where the exhaust gas flow 60 is directed through an inner passage 84 through the heat exchanger assembly 70. The outer passage 82 and the inner passage 84 are concentric. The example fuel system 64 provides one of a first fuel 66 and a second fuel 68 to a combustor 56 to generate an exhaust gas flow 60. In one example embodiment, the first fuel 66 is a hydrocarbon based fuel and the second fuel 68 is a cryogenic fuel.

During operation with the first fuel flow 66, the exhaust gas flow 60 is directed through the outer passage 82 radially outward of the heat exchanger assembly 70. During operation with the cryogenic second fuel 68, the exhaust gas flow 60 is communicated through the inner passage 84 to the heat exchanger assembly 70 to communicate thermal energy to the bottoming cycle system 92 to generate shaft power 94. The example dual exhaust path assembly 72 includes forward blocker doors 74 and aft blocker doors 76. The blocker doors 74, 76 are movable to direct the exhaust gas flow 60 through a selected one of the outer passage 82 and the inner passage 84. A controller 90 provides for control of the blocker doors 74, 76 to direct the exhaust gas flow 60 depending on which fuel is being utilized.

The propulsion system 20 includes a core engine 25 that is disclosed by way of example as a two-spool turbofan that incorporates a fan section 22, a compressor section 24, a combustor section 26, and a turbine section 28. The fan section 22 may include a single-stage having a plurality of fan blades 42. The fan blades 42 may have a fixed stagger angle or may have a variable pitch to direct incoming airflow from an engine inlet. The fan section 22 drives a bypass airflow 34 along a bypass flow path B in a bypass duct defined within nacelle 18 and also drives air as a core flow 62 along a core flow path C for compression and communication into the combustor section 26 then expansion through the turbine section 28. One of the first and second fuels 66, 68 is mixed with the compressed air in the combustor 56 and ignited to generate the exhaust gas flow 60 that is eventually directed though the dual exhaust path assembly 72 and exhausted to the atmosphere through a nozzle 96.

Although depicted as a ducted two-spool turbofan gas turbine engine in the disclosed non-limiting embodiment, it should be understood that the concepts described herein are not limited to use with ducted and/or two-spool turbofans as the teachings may be applied to other types of turbine engines including three-spool architectures, and/or open rotor, turboshaft or other type of gas turbine engine.

The exemplary core engine 25 includes a low speed spool 30 and a high speed spool 32 mounted for rotation about an engine central longitudinal axis A relative to an engine static structure 36 via several bearing systems 38. It should be understood that various bearing systems 38 at various loca-
tions may alternatively or additionally be provided, and the
location of bearing systems 38 may be varied as appropriate
to the application.

The low speed spool 30 includes an inner shaft 40 that
interconnects, a first (or low) pressure compressor 44 and a
first (or low) pressure turbine 46. The inner shaft 40 is
connected to the fan section 22 through a speed change
mechanism, which in the exemplary core engine 25 is
illustrated as a geared architecture 48 to drive the fan section
22 at a lower speed than the low speed spool 30. The inner
shaft 40 may interconnect the low pressure compressor 44
and low pressure turbine 46 such that the low pressure
compressor 44 and low pressure turbine 46 are rotatable at
a common speed and in a common direction. In other
embodiments, the low pressure turbine 46 drives both the
fan section 22 and low pressure compressor 44 through the
geared architecture 48 such that the fan section 22 and low
pressure compressor 44 are rotatable at a common speed.
Although this application discloses geared architecture 48,
its teaching may benefit direct drive engines having no
geared architecture.

The high speed spool 32 includes an outer shaft 50 that
interconnects a second (or high) pressure compressor 52 and
a second (or high) pressure turbine 54. A combustor 56 is
arranged in the exemplary core engine 25 between the high
pressure compressor 52 and the high pressure turbine 54. A
mid-turbine frame 58 of the engine static structure 36 may
be arranged between the high pressure turbine 54 and the
low pressure turbine 46. The mid-turbine frame 58 further
supports bearing systems 38 in the turbine section 28. The
inner shaft 40 and the outer shaft 50 are concentric and rotate
via bearing systems 38 about the engine central longitudinal
axis A which is collinear with their longitudinal axes.

The core engine 25 may be a high-bypass geared aircraft
engine. It should be understood that the teachings disclosed
herein may be utilized with various engine architectures,
such as low-bypass turbofan engines, prop fan and/or open
rotor engines, turboprops, turbojets, etc.

The geared architecture 48 may be an epicyclic gear train,
such as a planetary gear system or a star gear system. The
epicyclic gear train may include a sun gear, a ring gear, a
plurality of intermediate gears meshing with the sun gear
and ring gear, and a carrier that supports the intermediate
gears. The sun gear may provide an input to the gear train.
The ring gear (e.g., star gear system) or carrier (e.g.,
planetary gear system) may provide an output of the gear
train to drive the fan section 22.

Referring to FIG. 2, with continued reference to FIG. 1,
the example fuel system 60 provides at least two fuel types
for the core engine 25. In one example embodiment, the fuel
system 64 provides the first 66 as a hydrocarbon based fuel.
The second fuel 68 is a cryogenic fuel. The fuel system 64
further includes any required pumps, valving, and conduits
for supplying and switching between fuels.

In one example embodiment, the first fuel 66 is a carbon
based fuel such as, for example, kerosene. In one example
embodiment, the second cryogenic fuel 68 is a hydrogen-
based fuel. The hydrogen-based fuel may be hydrogen
and/or be derived from hydrogen containing compounds
such as ammonia. In another example embodiment, the
cryogenic fuel is a liquid natural gas. It should be appreci-
ated that although hydrogen, ammonia and liquid natural gas
are disclosed by way of example, other cryogenic fuels
could be utilized and are within the scope and contemplation
of this disclosure.

The fuel system 64 is operable to provide at least one of
the first fuel 66 and the second fuel 68 based on engine
operating conditions, and/or a predefined operating profile.
The controller 90 is utilized to control the operation of the
fuel system 64 along with the dual exhaust path assembly
72. For example, the controller 90 may control a flow of the
first fuel 66 based on a first operating condition and/or
operating profile and may switch to the second fuel 68 in
response to identifying a change from the first operating
condition and/or operating profile, such as to a second
operating condition and/or operating profile. During the
transition, the controller 90 may decrease the flow of the first
fuel 66 while increasing the flow of the second fuel 68 (or
vice versa). Accordingly, there may be a period in which
both fuels are routed to the combustor 56. The example
controller 90 is a device and system programmed to perform
necessary computing or calculation operations for operation
of the fuel system 64 and dual exhaust path assembly 72.
The controller 90 may be specially constructed for the
operation of the fuel system 64 and the dual exhaust path
assembly 72, or it may comprise at least a general-purpose
computer selectively activated or reconfigured by software
instructions stored in a memory device. The controller 90
may further be part of full authority digital engine control
(FADEC) or an electronic engine controller (EEC).

The bottoming cycle 92 provides for recovery of thermal
energy from the exhaust gas flow 60. In one disclosed
example embodiment, thermal energy from the exhaust gas
flow 60 heats a working fluid flow 104 that is expanded
through a bottoming turbine 98 to generate shaft power 94.
In one example embodiment, the generated shaft power 94
is utilized to drive a generator 102 to produce electric power.
The bottoming cycle 92 may further include a bottoming
compressor 100 driven by the bottoming turbine 98 to
compress the working fluid flow 104. The bottoming cycle
92 is operated, in one example embodiment, when the
second cryogenic fuel 68 is utilized.

The low temperature of the cryogenic fuel 68 is utilized
to cool the working fluid flow 104 and provide a temperature
differential that provides efficient capture of thermal energy
from the exhaust gas flow 60. In one disclosed example
embodiment, the cryogenic second fuel 68 is heated by the
exhaust gas flow in an exhaust heat exchanger 106 and
accepts heat from the working fluid flow 104 in a bottoming
heat exchanger 108. A pump 110 provides for pressurization
and communication of the cryogenic second fuel 68 through
the heat exchangers 106, 108 and to the combustor 56.

Figures 3, 4:
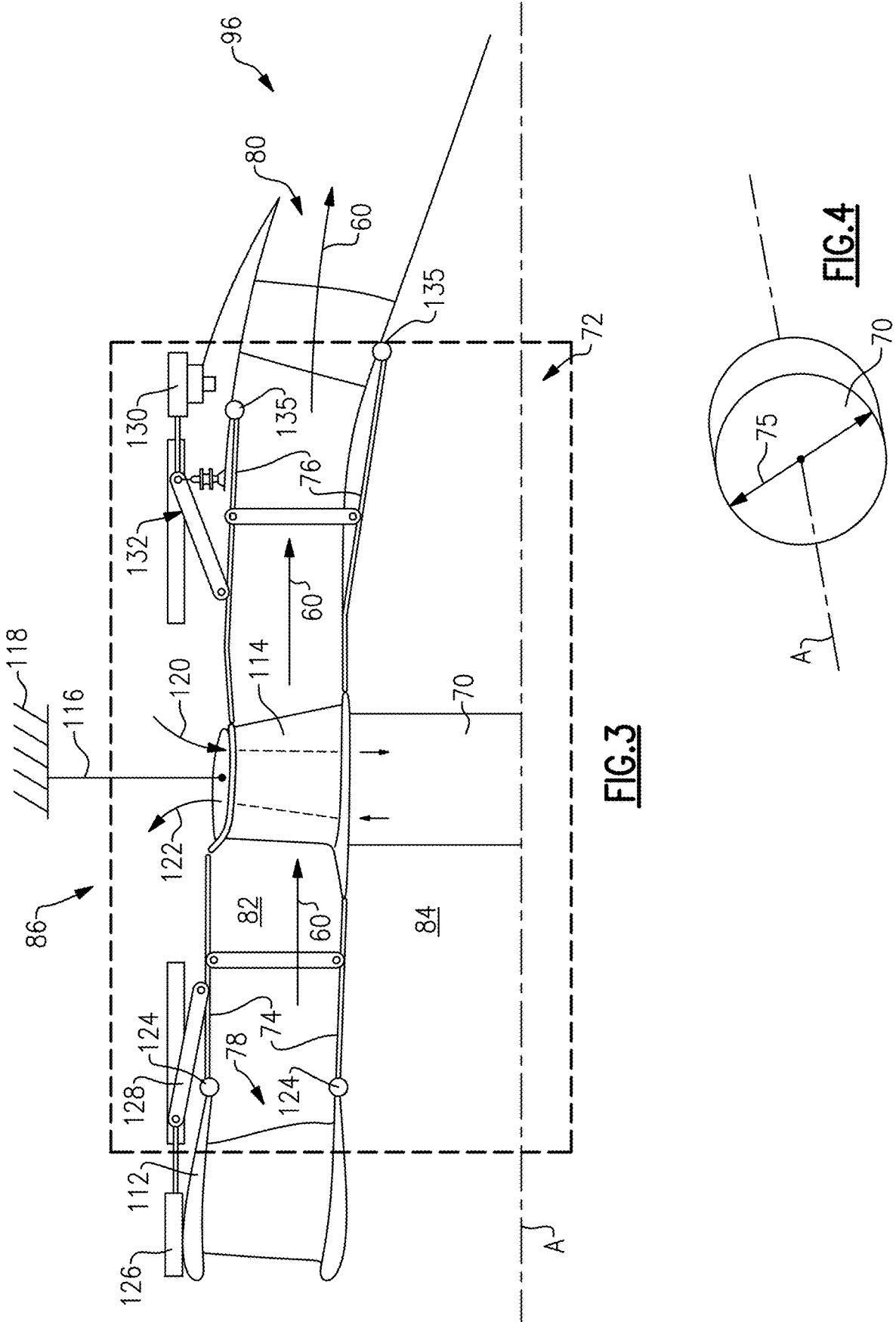
FIG. 3 is a schematic cross-section of an example dual exhaust path assembly in a bypass configuration.
FIG. 4 is a schematic view of an example heat exchanger assembly disposed about the engine longitudinal axis.

Referring to FIG. 3, with continued reference to FIGS. 1
and 2, the example dual exhaust path assembly 72 is shown
in a bypass configuration 86 where the exhaust gas flow 60
is directed though the radially outer passage 82. In an
embodiment, the controller 90 may, in response to deter-
mining a first operating condition and/or operating profile
(e.g., a concentration of fuel being more than 50% a first
fuel), place the dual exhaust path assembly 72 in the bypass
configuration 86. In the bypass configuration 86, the forward
blocker doors 74 direct the exhaust gas flow 60 through a
strut 114 radially outward of the heat exchanger assembly
70. The aft blocker doors 76 are arranged to direct the
exhaust gas flow 60 out an outlet 80.

The example dual exhaust path assembly 72 includes a
single inlet 78 from the turbine section 28 (FIG. 2) and a
single outlet 80. The single inlet 78 is annular about the
engine longitudinal axis A. The exhaust gas flow 60 is
selectively directed through one of the concentric radially
outer passage 82 and the radially inner passage 84. The
forward blocker doors 74 are pivotable about a corresponding hinge or pivot 124 and moved by an actuator 126 though a forward coupling mechanism 128. The forward coupling mechanism 128 is schematically shown as a series of links to the forward blocker doors 74. The links of the coupling mechanism 128 convert linear movement of the actuator 126 into pivoting radial movement of the blocker doors 74. Exhaust gas flow from the inlet 78 is directed to one of the outer passage 82 and the inner passage 84 by the blocker doors 74.

The outer passage 82 is an annular passage that is disposed radially outward of the heat exchanger assembly 70. In one example embodiment, a static strut 114 is disposed radially outward of the heat exchanger assembly 70 and is disposed within the outer passage 82. The example dual exhaust path assembly 72 is supported at an aft end of the turbine exhaust case that is schematically indicated at 112. The static strut 114 provides further support of the dual exhaust path assembly 72 so that the weight is not entirely born by the turbine exhaust case 112. A support 116 coupled to fixed structure 118 is provided to the static strut 114 to bear the load of the dual exhaust path assembly 72. The fixed structure 118 may be portion of an aircraft fuselage, pylon, or any other load bearing structure of an engine, nacelle, or aircraft. The support 116 provides for the static strut 114 to bear loads instead of having the entire dual exhaust path assembly 72 and heat exchanger assembly 70 generating a cantilevered load from the core engine structure.

The aft blocker doors 76 direct the exhaust gas flow 60 through a single outlet 80 from either the outer passage 82 as is shown in FIG. 3, or from the inner passage 84. In one disclosed example the single outlet 80 is an annular opening that extends about the engine longitudinal axis A. The aft blocker doors 76 are disposed about corresponding pivots 135. An actuator 130 provides for movement of the aft blocker doors 76 through an aft coupling mechanism 132. The aft coupling mechanism 132 includes links to the aft blocker doors 76 that translate liner movement from the actuator 130 into pivoting movement of the blocker doors 76.

Although example actuators, pivots and mechanical couplings are shown and described, other actuator and coupling configurations may be utilized to effectuate movement of the forward and aft blocker doors 74, 76 and are within the contemplation and scope of this disclosure.

Moreover, the example dual exhaust assembly 72 is disposed annularly about the heat exchanger assembly 70. Accordingly, the example dual exhaust assembly 72 includes a plurality of forward blocker doors 74 and the accompanying actuators 126 and linkages 128 arranged annularly about the engine longitudinal axis A. A corresponding plurality of aft blocker doors 76, actuators 130 and aft coupling mechanisms are arranged about the engine longitudinal axis A to control flow through the outlet 80.

Additionally, one or a combination of the forward blocker doors 74 and the aft blocker doors 76 could be actuated independently and separately to enable a variation in flow through the heat exchanger assembly 70.

Referring to FIG. 4 with continued reference to FIG. 3, the example heat exchanger assembly 70 is disposed about the engine longitudinal axis A and is structured to be disposed within an uninterrupted interior space 75. The space 75 may be circular shaped, rectangular, or irregularly shaped depending on the configuration of the heat exchanger assembly 70. Accordingly, the heat exchanger assembly 70 is not an annular structure but is instead a structure that is disposed within a continuous uninterrupted interior space 75. By configuring the heat exchanger assembly 70 in the manner shown, moment forces encountered are minimized. The orientation and placement of the heat exchanger assembly 70 within the radially inner passage 84 reduces rotational moments inertia due to the ability to have a smaller diameter. Moreover, flows that are exhausted from the heat exchanger assembly 70 from the radially inner passage 84 may provide easier combination with bypass flows 34 (FIGS. 1, 2) through the nozzle 96.

An inlet passage 120 and outlet passage 122 for the working fluid flow 104 is communicated though at least one of the struts of the static strut 114. The passages 120 and 122 are shown schematically and could be arranged though several strut assemblies or a single strut assembly. The passages 120, 122 would be routed to the bottoming cycle 92 (FIGS. 1 and 2) directly from the strut 114 or to other systems of the aircraft propulsion system.

Figure 5:
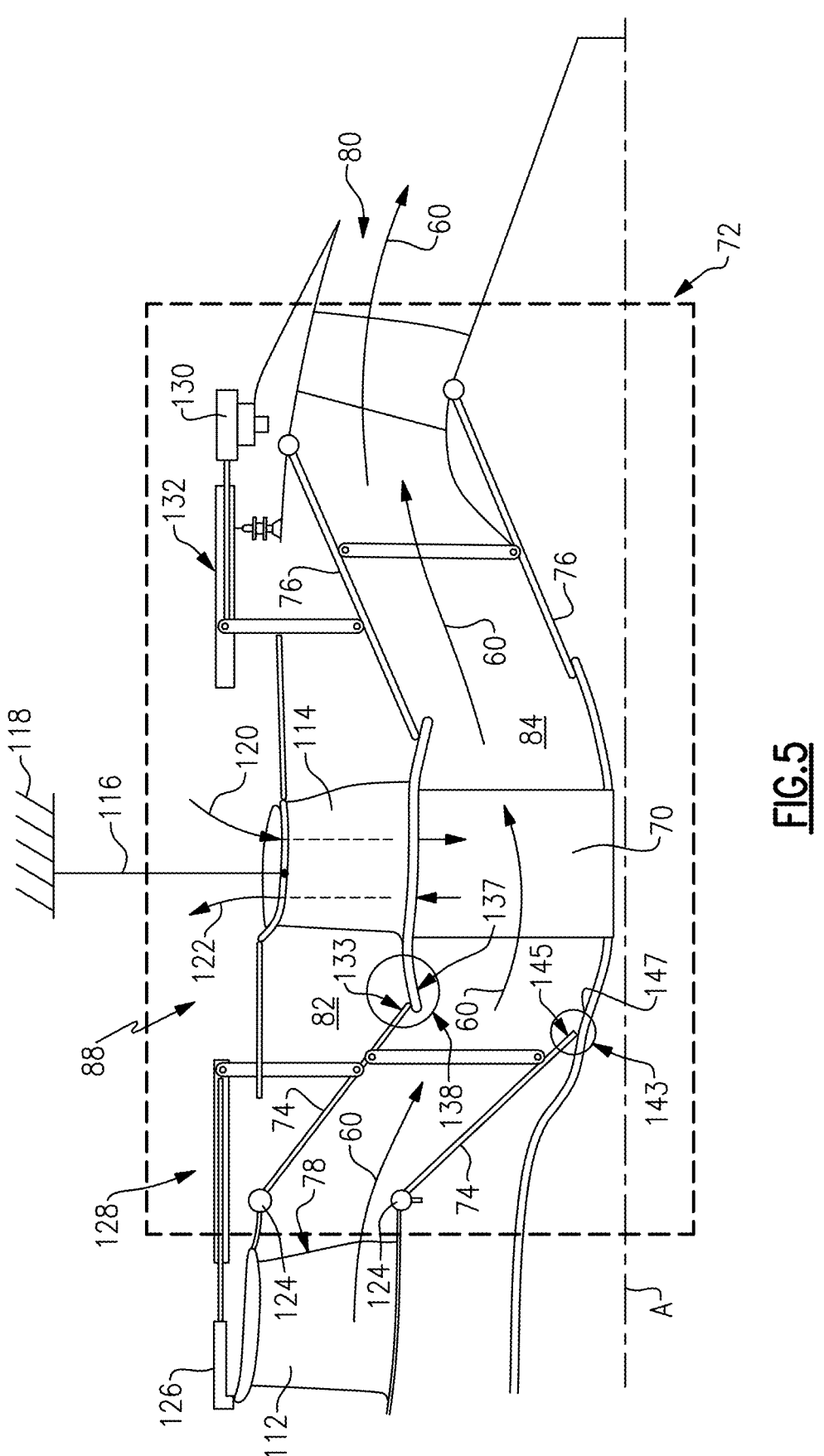
FIG. 5 is a schematic view of the example dual exhaust path assembly in a heat exchange configuration.

Referring to FIG. 5 with continued reference to FIGS. 1 and 2, the dual exhaust path assembly 72 is shown in the heat exchange configuration 88 to direct the exhaust gas flow 60 through the heat exchanger assembly 70. In an embodiment, the controller 90 may, in response to determining a second operating condition and/or operating profile (e.g., a concentration of fuel being more than 50% a second fuel), place the dual exhaust path assembly 72 in the heat exchange configuration 88. In the heat exchange configuration 88, the exhaust gas flow 60 is directed radially inward into the inner passage 84 by the forward blocker doors 74 from the inlet 78. The heat exchanger assembly 70 creates a resistance to flow that may increase pressure forward of the heat exchanger assembly 70. Accordingly, an outer seal assembly 138 is provided between an outer end portion 133 of the blocker door 74 and an outer fixed portion 137. The outer seal assembly 138 substantially prevents leakage of the exhaust gas flow 60 from the inner passage 84.

An inner seal assembly 143 is provided between an inner end portion 145 of a blocker door 74 and an inner fixed portion 147. The inner seal assembly 143 substantially prevents leakage of the exhaust gas flow around the heat exchanger assembly 70. The specific configuration of the seal assemblies 138, 143 may vary depending on application specific configurations and remain within the contemplation and scope of this disclosure.

In the disclosed example, the exhaust gas flow 60 is directed radially outward by the aft blocker doors 76 aft of the heat exchanger assembly 70. Accordingly, in the example embodiment shown in FIGS. 3 and 5, the exhaust gas flow 60 is exhausted through the outlet 80 in either the bypass configuration 86 (FIG. 3) or the heat exchange configuration 88 (FIG. 5).

In the event of a improper functioning of the aft blocker doors 76, the controller 90 associated with the dual exhaust path assembly 72 may be configured to cause an emergency operation of the aft blocker doors 76 and/or otherwise route the exhaust flow 60 out of the nozzle 96 or through other outlets.

Figure 6:
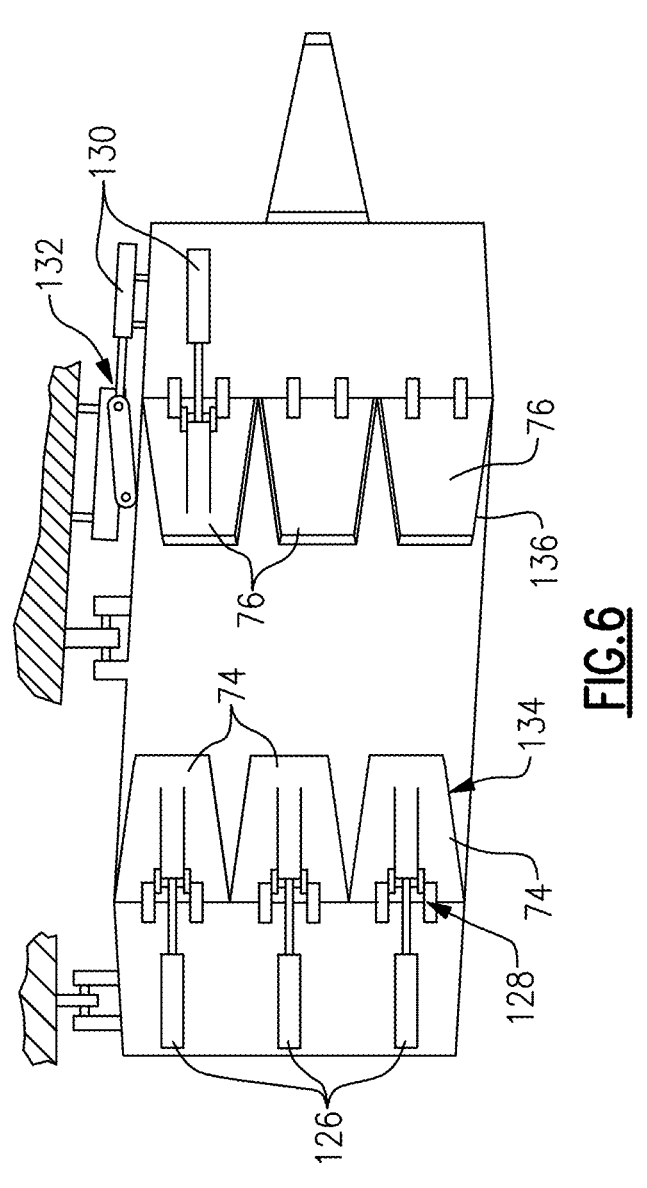
FIG. 6 is a side view of example blocker doors of the example dual exhaust path assembly.

Referring to FIG. 6, with continued reference to FIGS. 3 and 5, because the outer passage 82 is an annulus radially outward of the inner passage 82, it will have a larger outer diameter. Accordingly, the example blocker doors 74, 76 are configured to expand radially outward when in the bypass configuration 86 shown in FIG. 3 and contact inward to accommodate the smaller diameter of the inner passage 84 when in the heat exchange configuration 88 shown in FIG. 5. In the disclosed example embodiment, the blocker doors 74 have tapered sides 134 so that upon inward movement to the heat exchange configuration, the blocker doors 74 will seal in a smaller diameter. The aft blocker doors 76 include tapered sides 136 that also correspond with the inner passage 82.

Figure 8:
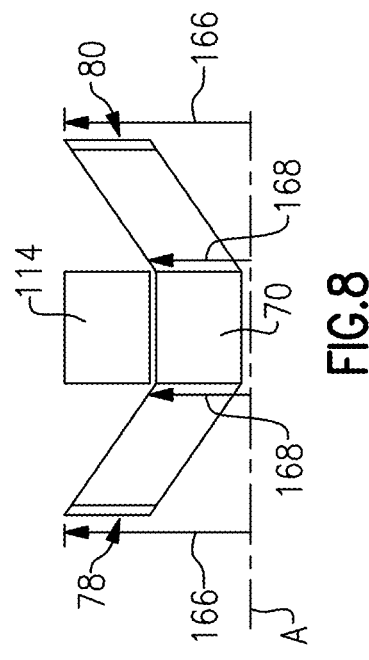
FIG. 8 is a schematic view of the dual exhaust path assembly in the heat exchange configuration.
Figure 7:
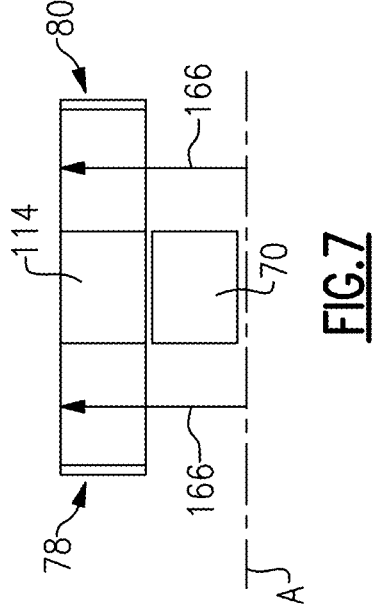
FIG. 7 is a schematic view of the dual exhaust path assembly in the bypass configuration.

Referring to FIGS. 7 and 8 with continued reference to FIG. 6, the tapered sides 134 and 136 provide for the blocker doors 74, 76 to transition from a substantially annular passage to one that tapers radially inward toward the engine longitudinal axis A. In the bypass configuration 86 (FIG. 3), the outer passage 82 includes a substantially uniform outer diameter 166 to provide a substantially straight passage between the inlet 78 to the outlet 80. In the heat exchange configuration 88 (FIG. 5) the tapered sides 134, 136 provide for the doors to generate a change in diameter between the inlet 78 and the heat exchanger assembly 70.

As shown in FIG. 8, the outer diameter 166 at the inlet tapers radially inward to a reduced inner diameter 168 at the heat exchanger assembly 70. The tapered blocker doors 74 move radially inward to form the inner diameter 168. The aft blocker doors 76 also taper inward to provide the same inner diameter 168 at the exit of the heat exchanger assembly 70. The passage tapers radially outward toward outlet 80 that is disposed at substantially the same outer diameter 166 as that of the inlet 78. Although example blocker doors configuration is shown and described, other configurations that may be actuated to effectuate the different radial routing of the exhaust gas flow 60 could be utilized and are within the contemplation and scope of this disclosure.

Figure 9:
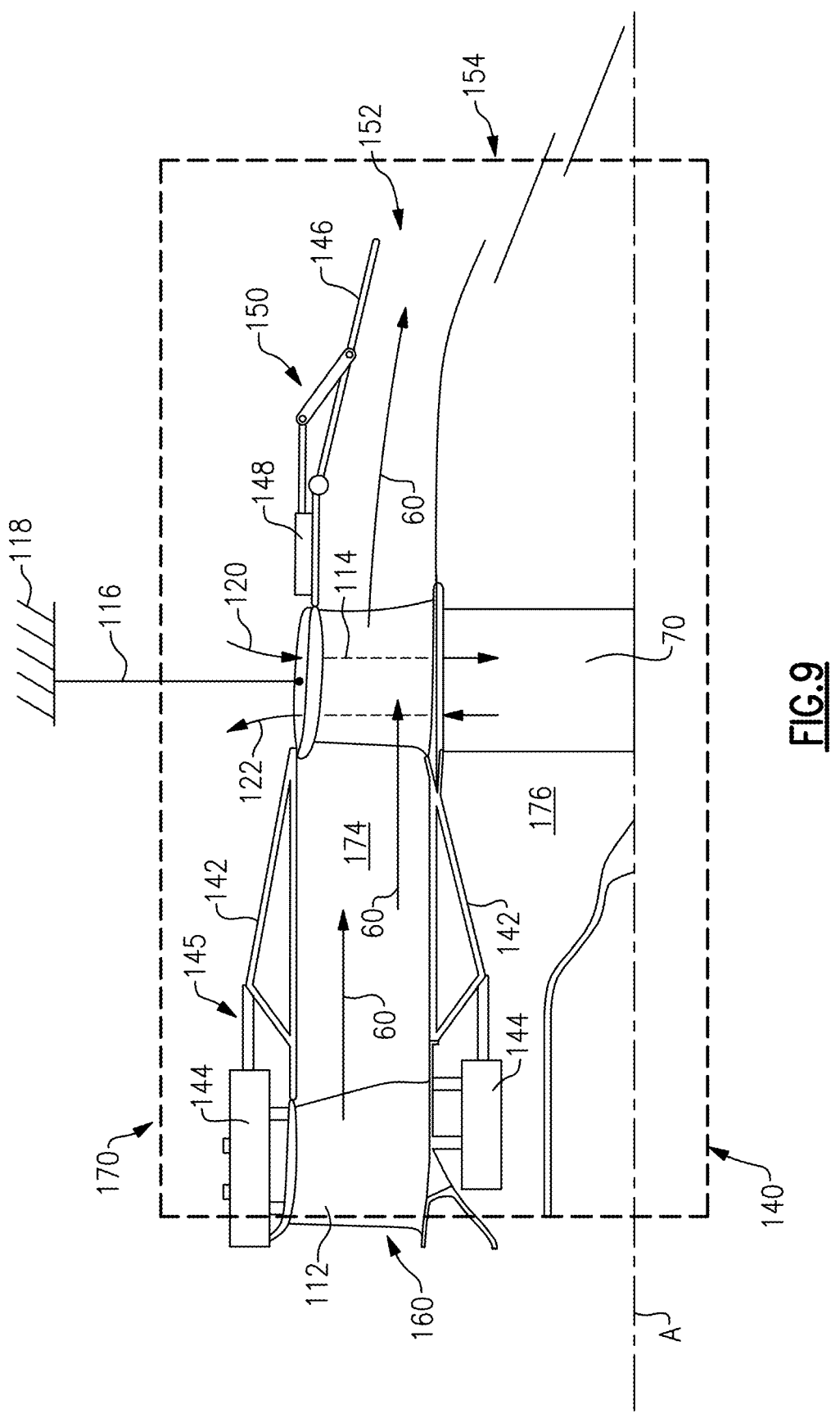
FIG. 9 is a schematic cross-section of another example dual exhaust path assembly in a bypass configuration.

Referring to FIG. 9, another example dual exhaust path assembly 140 includes a single inlet 160, an outer outlet 152, and an inner outlet 154. The different outlets 152, 154 correspond with the inner and outer passage 176, 174. In the bypass configuration 170 shown in FIG. 9, forward blocker doors 142 direct the exhaust gas flow 60 through the outer passage 174. The outer passage 174 is concentric with an inner passage 176. The heat exchanger assembly 70 is disposed within the inner passage 176.

The forward blocker doors 142 are coupled to an actuator 144 by a series of 145 links. The links 145 translate axial movement of the actuator 144 into radially pivoting movement of the blocker doors 142. The outer passage 174 directs the exhaust gas flow through the strut 114 and through the outer outlet 152. The outer outlet 152 is part of an engine nozzle where the exhaust gas flow 60 is exhausted to the atmosphere. The exhaust gas flow 60 from that bypasses the heat exchanger assembly 70 may be mixed with a bypass airflow upon exiting through outlet 152.

Aft blocker doors 146 are moved by an aft actuator 148 through an aft linkage 150. The aft blocker doors 144 are movable to block the outlet 152 when the exhaust gas flow is directed radially inward through the inner passage 176.

Figure 10:
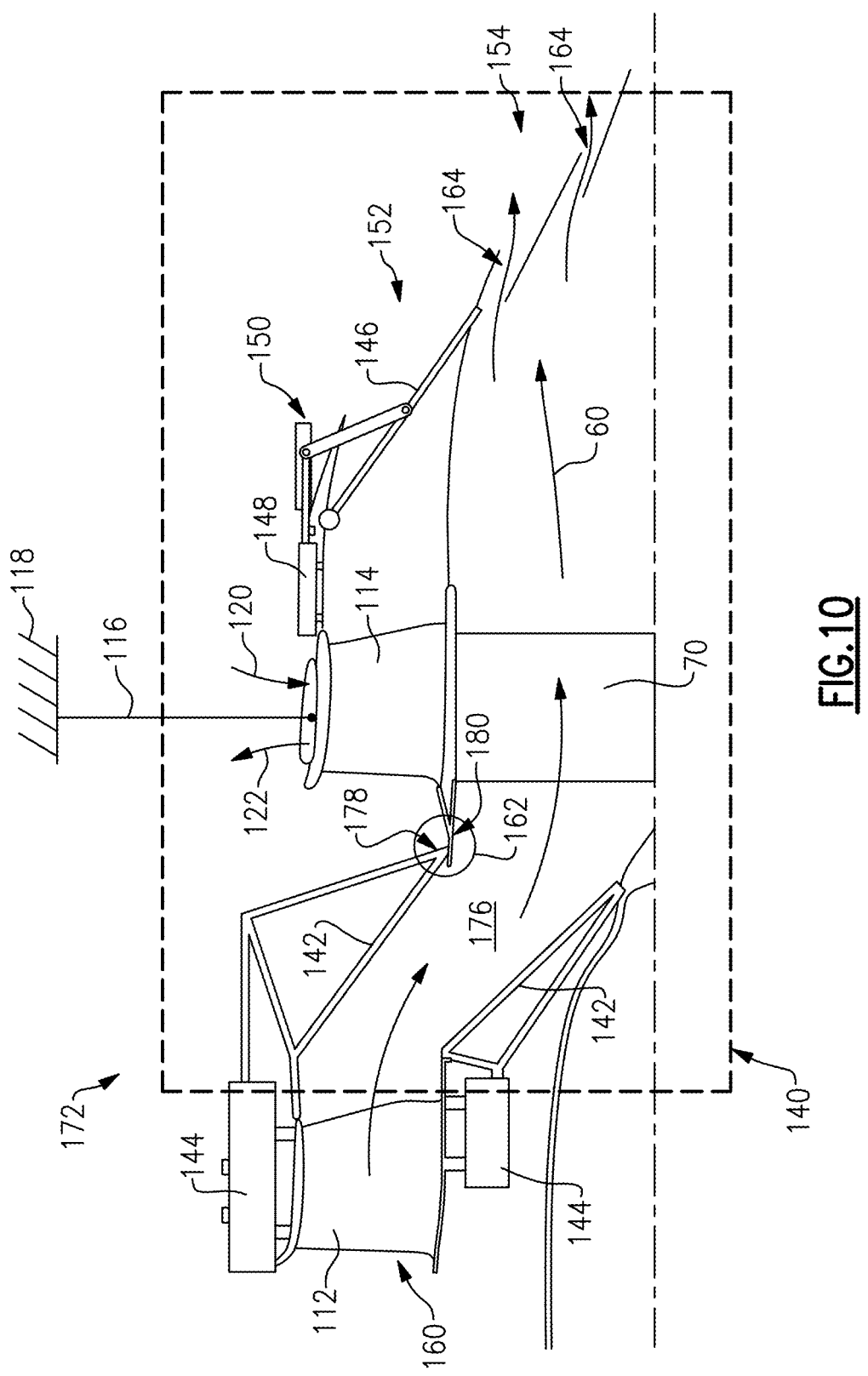
FIG. 10 is a schematic cross-section of the example dual exhaust path assembly shown in FIG. 9 in a heat exchange configuration.

Referring to FIG. 10, with continued reference to FIG. 9, the dual exhaust path assembly 140 is shown in a heat exchange configuration 172. In the heat exchange configuration 172, the forward blocker doors 142 direct the exhaust gas flow 60 radially in ward into the inner passage 176 to the heat exchanger assembly 70.

In the heat exchange configuration 172, a back pressure in the exhaust gas flow 60 may be created due to a resistance to flow through the heat exchanger assembly 70. A seal assembly 162 is used to prevent leakage creates a back pressure due to resistance to flow. The seal assembly 168 is provided between an end portion 178 of the blocker doors 142 and a static splitter 180 that is disposed forward of the heat exchanger assembly 70.

The aft blocker doors 146 are moved inward to close off the outer outlet 152. Exhaust gas flow 60 that exiting the heat exchanger assembly 70 is directed axially through the inner outlet 154. Accordingly, flow exiting the heat exchanger assembly 70 does not have to be directed radially outward.

Figure 11:
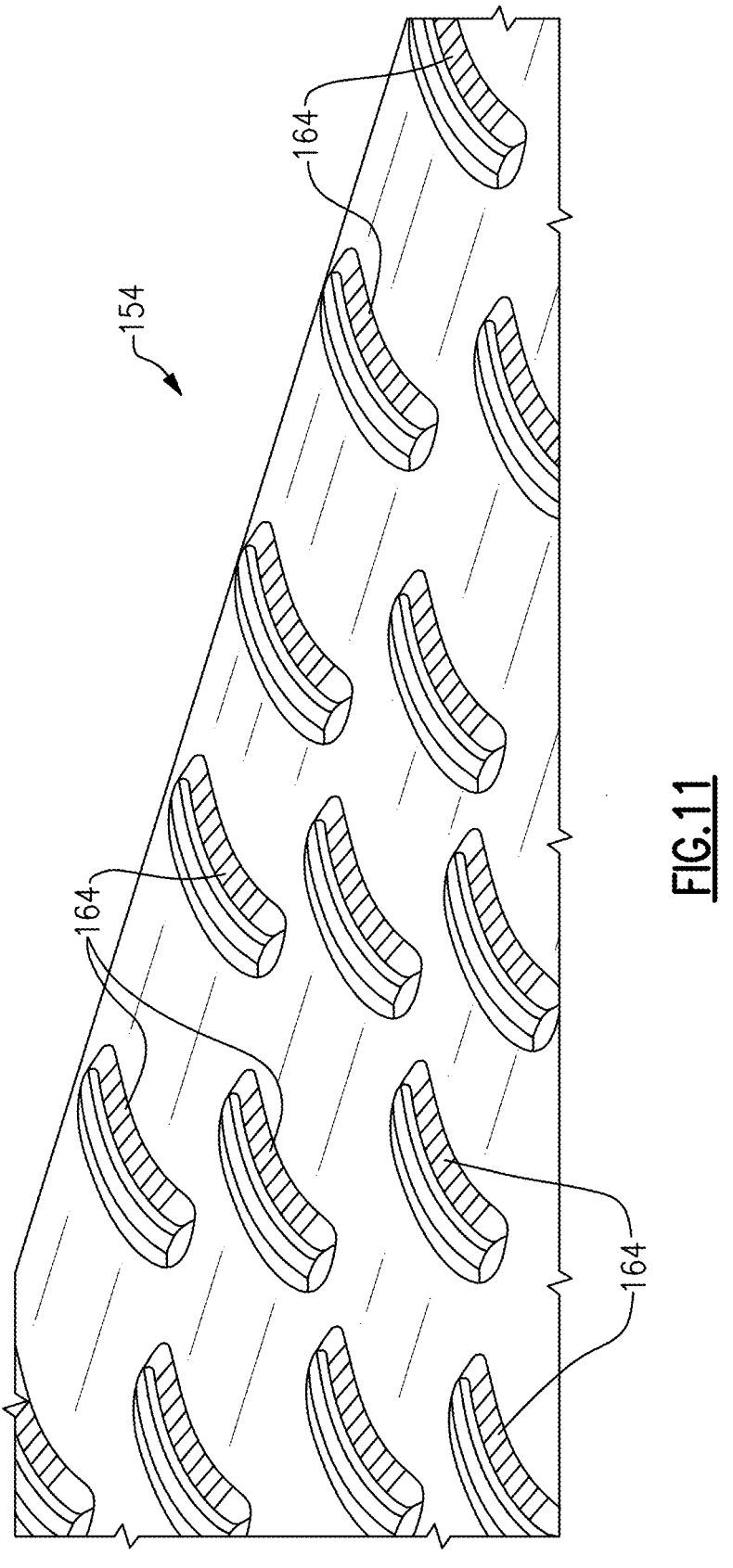
FIG. 11 is a partial view of an external surface of an example exhaust nozzle.

Referring to FIG. 11 with continued reference to FIG. 10, the inner outlet 154 includes a series of spaced apart slots 164. The spaced apart slots 164 provide for the low flow and low thrust exhaust gas flow 60 from the heat exchanger assembly 70 to be exhausted with minimal disruption to bypass flow 34 (FIG. 1) exhausted through the bypass passage B.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. An aircraft propulsion system comprising:
a core engine comprising a main compressor where an inlet airflow is compressed and communicated to a combustor to generate an exhaust gas flow that is expanded through a main turbine section to generate power used to drive the main compressor and a propulsive fan;
a fuel system configured to provide at least two fuel types to the combustor for generating the exhaust gas flow;
a heat exchanger assembly operable for placing the exhaust gas flow in thermal communication with a working fluid flow;
a dual exhaust path assembly comprising actuatable blocker doors moveable between a bypass configuration for directing the exhaust gas flow through an outer passage and a heat exchange configuration for directing the exhaust gas flow through the heat exchanger assembly, wherein the dual exhaust path assembly comprises a single inlet configured to receive an exhaust gas flow from the main turbine section and an outlet for the exhaust gas flow from one of the outer passage and an inner passage housing the heat exchanger assembly and the blocker doors comprise forward blocker doors and aft blocker doors, the forward blocker doors are configured to direct the exhaust gas flow from the inlet to one of the outer passage and the inner passage; and
a controller programmed to operate the dual exhaust path assembly to switch between the bypass configuration and the heat exchange configuration based at least in part on a concentration of fuel of the at least two fuel types that the fuel system is providing to the combustor.

2. The aircraft propulsion system as recited in claim 1, wherein the heat exchanger assembly is disposed about an engine longitudinal axis.

3. The aircraft propulsion system as recited in claim 2, wherein the heat exchanger assembly comprises a disk shape disposed about the engine longitudinal axis.

4. The aircraft propulsion system as recited in claim 1, wherein the heat exchanger assembly is disposed within an inner passage and the outer passage comprises an annular passage disposed concentrically around the inner passage.

5. The aircraft propulsion system as recited in claim 1, wherein the outlet is disposed radially outward of the heat exchanger and wherein the aft blocker doors are configured to direct exhaust gas flow from either the outer passage or the inner passage through the outlet.

6. The aircraft propulsion system as recited in claim 1, wherein the outlet comprises an outer outlet for the exhaust gas flow from the outer passage and an inner outlet for exhaust gas flow from the heat exchanger assembly, and the aft blocker doors are configured to block the outer outlet when exhaust gas flow is routed through the heat exchanger assembly.

7. The aircraft propulsion system as recited in claim 6, wherein the inner outlet comprises a tail cone disposed about the engine longitudinal axis with a plurality of openings for the exhaust gas flow.

8. The aircraft propulsion system as recited in claim 1, wherein the dual exhaust path assembly is attached aft of a turbine exhaust case.

9. The aircraft propulsion system as recited in claim 1, further comprising a bottoming cycle system where thermal energy communicated into the working fluid flow within the heat exchanger assembly is utilized to generate shaft power.

10. A bottoming cycle system for an aircraft propulsion system comprising:

a heat exchanger assembly operable for placing an exhaust gas flow in thermal communication with a working fluid flow;

a dual exhaust path assembly comprising actuatable blocker doors moveable between a bypass configuration for directing the exhaust gas flow through an outer passage and a heat exchange configuration for directing the exhaust gas flow through the heat exchanger assembly, wherein the outlet comprises an outer outlet for the exhaust gas flow from the outer passage and an inner outlet for exhaust gas flow from the inner passage, and the aft blocker doors are configured to block the outer outlet when exhaust gas flow is routed through the heat exchanger assembly;

a bottoming turbine where the heated working fluid flow from the heat exchanger assembly expands to generate shaft power; and a controller programmed to operate the dual exhaust path assembly to switch between the bypass configuration and the heat exchange configuration in response to a concentration of fuel of at least two fuel types of the fuel system is providing to a combustor, wherein the controller is further programmed to operate the dual exhaust path assembly in the bypass configuration in response to more of the first fuel than the second fuel being provided to the combustor and in the heat exchange configuration in response to more of the second fuel than the first fuel being provided to the combustor.

11. The bottoming cycle system as recited in claim 10, wherein the heat exchanger assembly is disposed within an inner passage and the outer passage comprises an annular passage disposed concentrically around the inner passage.

12. The bottoming cycle system as recited in claim 10, wherein the dual exhaust path assembly comprises a single inlet configured to receive an exhaust gas flow from the main turbine section and an outlet for the exhaust gas flow from one of the outer passage and an inner passage housing the heat exchanger assembly.

13. A method of operating an aircraft propulsion system comprising:

communicating a fuel flow comprising a selected one of a first fuel flow comprising a hydrocarbon based fuel and a second fuel flow comprising a cryogenic fuel to a combustor;

generating an exhaust gas flow within the combustor of a core engine by igniting a mixture of at least one of the first fuel flow and the second fuel flow and an inlet airflow within a combustor;

generating power by expanding the exhaust gas flow through a main turbine section to drive a compressor section and a propulsive fan; and operating a dual exhaust path assembly comprising an inlet to both an outer passage and an inner passage, and forward blocker doors that are moveable between a bypass configuration and a heat exchange configuration, wherein operating the dual exhaust path assembly comprises moving the forward blocker doors to the bypass configuration to direct the exhaust gas flow from the main turbine section through the outer passage in response to generating the exhaust gas flow utilizing the first fuel flow and moving the blocker doors to the heat exchange configuration to direct the exhaust gas flow from the main turbine section through a heat exchanger assembly within the inner passage for communicating thermal energy from the exhaust gas flow into a working fluid flow in response to generating the exhaust gas flow utilizing the second fuel flow.

14. The method as recited in claim 13, further comprising generating shaft power by expanding the heated working flow through a bottoming cycle turbine.

* * * * *